United States Patent [19]
Rogers et al.

[11] Patent Number: 5,829,835
[45] Date of Patent: Nov. 3, 1998

[54] CONVERTIBLE COMBINATION SHOPPING CART SEAT LINER AND DIAPER BAG AND METHOD OF CONVERTING SAME

[76] Inventors: Shirley W. Rogers; Sharla Michele Rogers, both of Rte. 2, P.O. Box 330, (Hwy. 330), Lake City, Fla. 32024

[21] Appl. No.: 804,037

[22] Filed: Feb. 24, 1997

[51] Int. Cl.⁶ .................................................. A47D 1/10
[52] U.S. Cl. ................. 297/256.17; 297/219.12; 297/129; 297/229; 297/228.1; 190/9; 224/577; 224/159; 280/33.993
[58] Field of Search ............................ 297/256.17, 228, 297/228.1, 229, 219.1, 228.11, 218.1, 129, 219.12; 280/33.992, 33.993; 190/1, 9; 5/94, 98.1; 224/158, 159, 161, 577

[56] References Cited

U.S. PATENT DOCUMENTS

| | | |
|---|---|---|
| D. 308,614 | 6/1990 | Gordon . |
| 2,537,864 | 1/1951 | Skaer ..................................... 224/159 |
| 3,297,119 | 1/1967 | Viol ........................................ 224/159 |
| 3,578,380 | 5/1971 | Jacobus .................................. 297/229 |
| 4,416,462 | 11/1983 | Thompson . |
| 4,568,125 | 2/1986 | Sckolnik . |
| 4,655,502 | 4/1987 | Houllis . |
| 4,666,207 | 5/1987 | Quartano . |
| 4,698,862 | 10/1987 | Mairs ........................................ 5/98.1 |
| 4,717,056 | 1/1988 | Carmichael ................................ 5/98.1 |
| 4,792,024 | 12/1988 | Morton et al. ............................... 190/1 |
| 4,805,937 | 2/1989 | Boucher et al. . |
| 4,889,388 | 12/1989 | Hime . |
| 4,999,863 | 3/1991 | Kane ........................................ 5/98.1 |
| 5,096,260 | 3/1992 | Hagerstrom . |
| 5,106,155 | 4/1992 | Luebring . |
| 5,238,293 | 8/1993 | Gibson ................................... 297/229 |
| 5,330,250 | 7/1994 | Reyes . |
| 5,333,769 | 8/1994 | Skroski ................................... 224/158 |
| 5,547,250 | 8/1996 | Childers . |

OTHER PUBLICATIONS

"Germguard", DuCo R&D Associates, Inc., Jan. 6, 1997, pp. 1–2.

*Primary Examiner*—Peter M. Cuomo
*Assistant Examiner*—Anthony D. Barfield

[57] ABSTRACT

A convertible combination shopping cart seat liner and diaper bag for use as both a seat liner and a diaper bag and methods of converting the same are provided. The convertible combination preferably has a flexible container sized and shaped to flexibly position within a shopping cart seat of a shopping cart. The flexible container has a bottom and a plurality of walls connected to and extending upwardly from the bottom. The plurality of walls include a front wall, a rear wall, and at least a pair of side walls connected to and extending between the front and rear walls so as to define an inner chamber for positioning a child and child diaper items therein. Each of the front and rear walls and each of the pair of side walls has an outer surface thereof sized and shaped so as to simultaneously abuttingly contact the inner surface of a corresponding wall of a shopping cart seat when the container is positioned therein. The front wall has two leg openings formed therein which correspond to the leg openings in a shopping cart seat for extending the legs of a child therethrough when the container is positioned in a shopping cart. A seat liner and diaper bag converter preferably is connected to the at least a pair of side walls for selectively converting the container between a configuration defining a seat liner for a shopping cart seat and a configuration defining a diaper bag. A handle preferably is connected to and extending upwardly from the flexible container for enabling a user to readily carry the diaper bag and the seat liner.

45 Claims, 4 Drawing Sheets

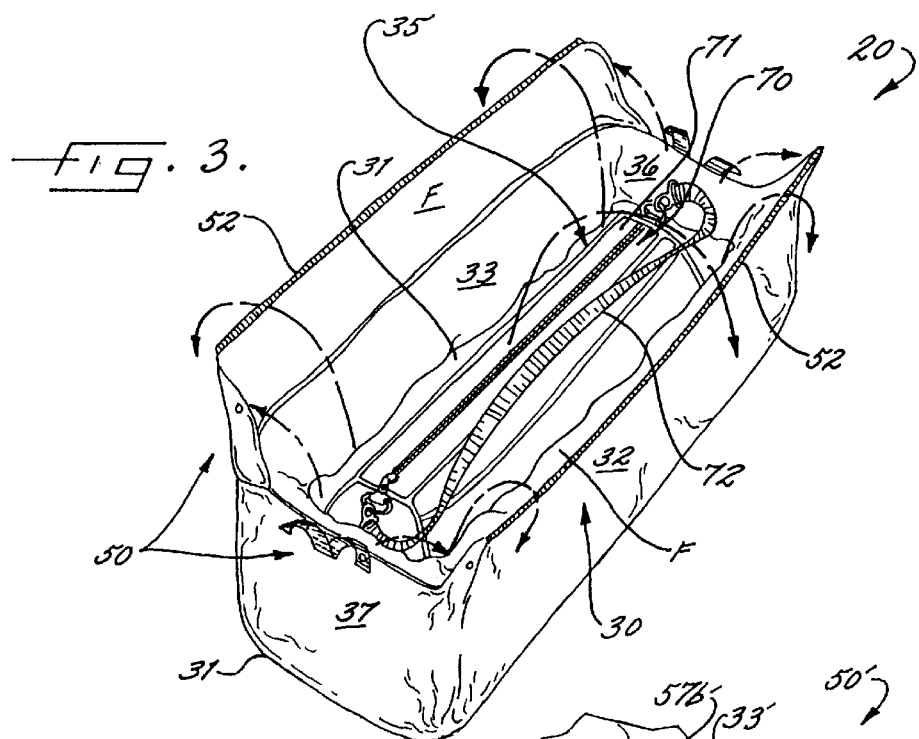
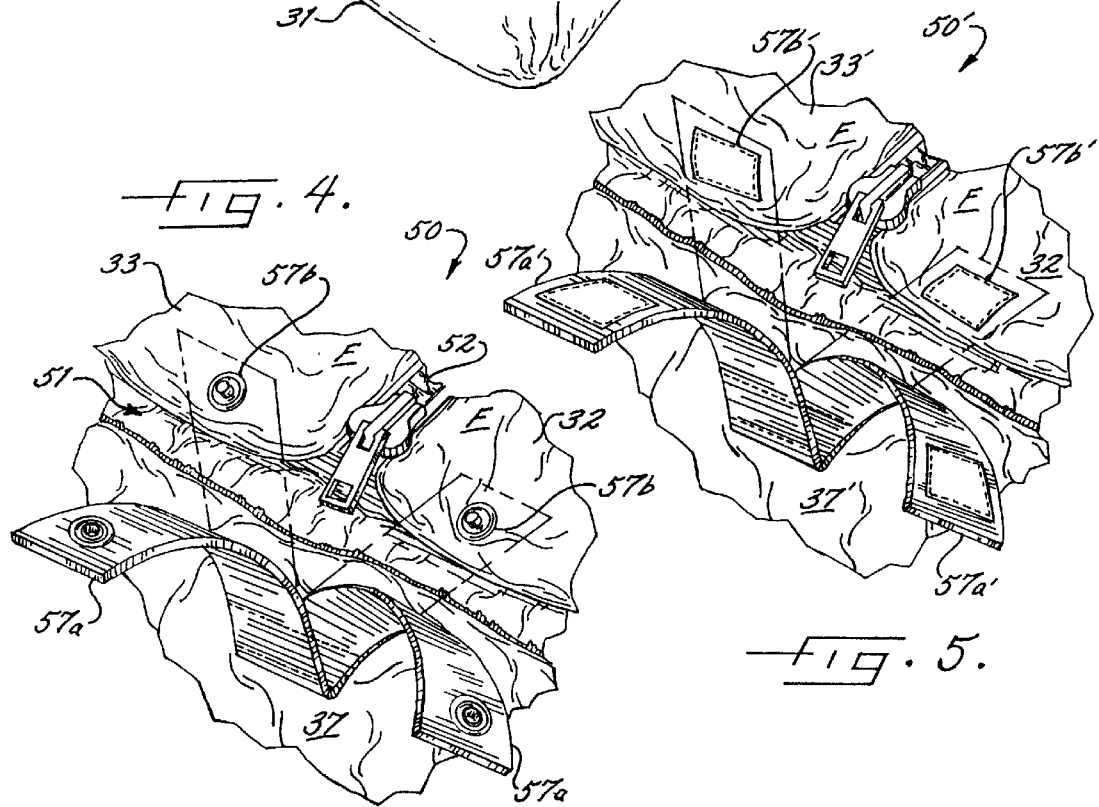

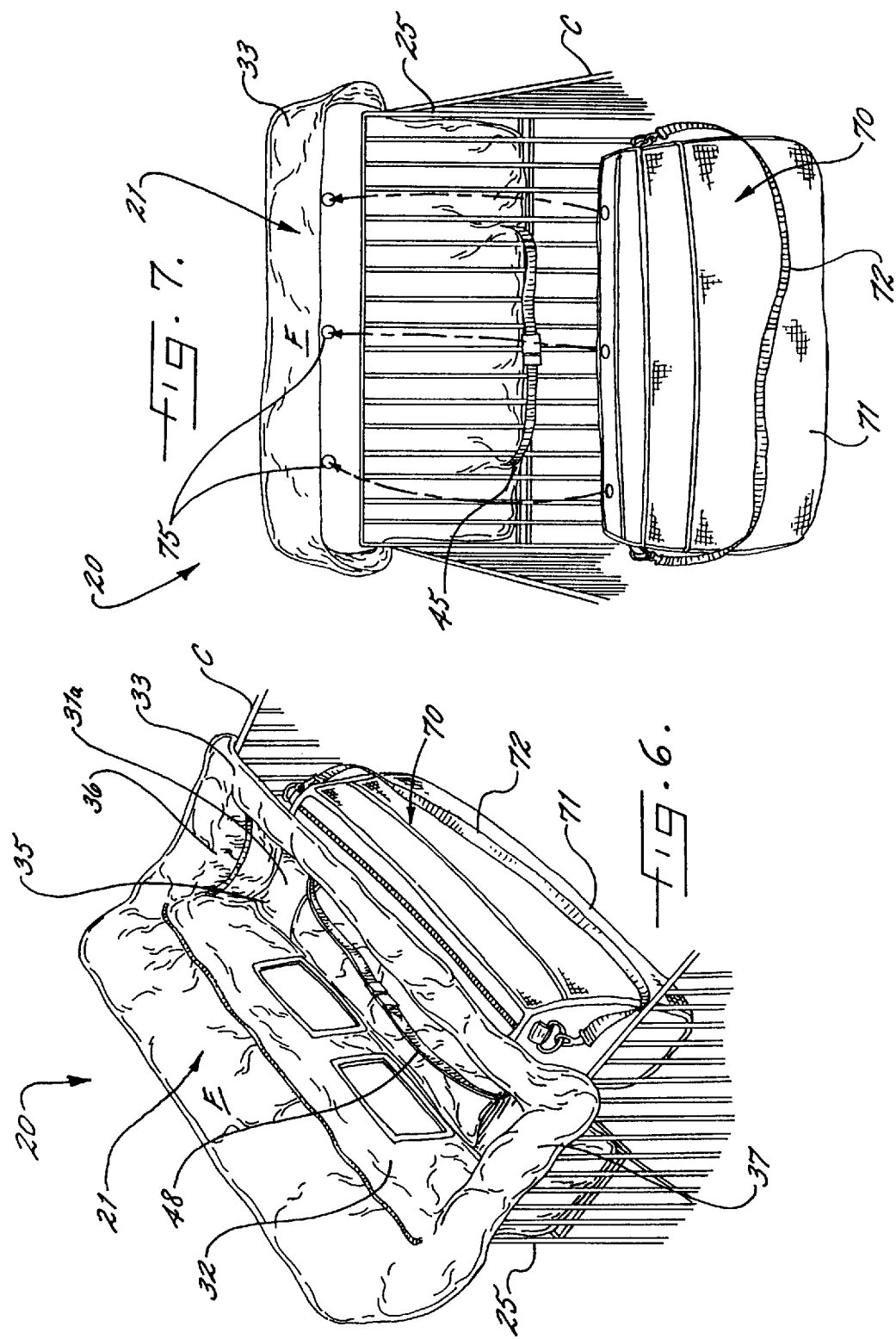

CONVERTIBLE COMBINATION SHOPPING CART SEAT LINER AND DIAPER BAG AND METHOD OF CONVERTING SAME

FIELD OF THE INVENTION

The present invention relates to child care industry and, more particularly, to the field of child protective devices for shopping carts.

BACKGROUND OF THE INVENTION

Over the years, shopping cart seat liners and various other child protective devices have been developed for the seats of shopping carts. These seat liners protectively provide a barrier for inhibiting the passage of germs, such associated with a cold, flu, viruses, or casually transmitted diseases, to a child positioned in the shopping cart seat. Examples of such shopping cart seat liners can be seen in U.S. Pat. No. 4,655,502 by Houllis titled "Multi-Adjustable Cushion For A Shopping Cart," U.S. Pat. No. 4,666,207 by Quartano titled "Child Shopping Cart Cushion," and U.S. Pat. No. 5,330,250 by Reyes titled "Liner For A Shopping Cart Child Seat." Despite the personal hygiene developments which have occurred over the years for these shopping cart seat liners, these seat lines are often bulky, difficult to carry— especially when a parent or guardian has the responsibility for also carrying or managing a small child or infant, and, in essence, only add to the multiplicity of child related items which a parent or guardian desires to carry during shopping trips or the like.

Some shopping seat liners have also been developed which allow child or infant items such as bottles, rattles, or toys to be detachably connected to the seat liner or a handle of the shopping cart. Examples of such seat liners can be seen in U.S. Pat. No. 4,805,937 by Boucher et al. titled "Handler Cover And Seat Cover For Shopping Cart" and U.S. Pat. No. 5,238,293 by Gibson titled "Shopping Cart Seat Cover." Nevertheless, these shopping cart seat liners merely roll or fold up to still add to the numerous items which a parent or guardian desires to carry during shopping trips. These shopping cart seat liners also are somewhat difficult to unroll or fold-out and to roll or fold-up, especially when a parent or guardian has the responsibility for also carrying or managing a small child or infant. The complexity and awkwardness of using these conventional seat liners and the bulkiness of these conventional seat liners often makes these shopping cart seat liners impractical for common or everyday usage during shopping trips by parents or guardians of small children.

SUMMARY OF THE INVENTION

With the foregoing in mind, the present invention advantageously provides a convertible combination shopping cart seat liner and diaper bag and methods of readily converting a shopping cart seat liner to a diaper bag and vice-versa. The present invention also advantageously provides a convertible combination shopping cart seat liner that when positioned in a shopping cart seat protectively inhibits contact by the child with exposed surfaces of the shopping cart seat. The present invention additionally provides a convertible combination shopping cart seat liner and methods of converting the same which advantageously reduce the number and location of child related items which a parent or guardian often desires to carry during shopping trips or travel in general. The present invention further provides a convertible combination shopping cart seat liner and methods of converting the same which allow a parent or guardian to easily convert, e.g., using only one hand, a shopping cart seat liner to a diaper bag and vice-versa even while carrying or managing a small child or infant.

More particularly, the present invention provides a convertible combination shopping cart seat liner and diaper bag for use as both a liner and a diaper bag. The convertible combination preferably has a flexible container sized and shaped to flexibly position within a shopping cart seat of a shopping cart. The convertible container has a bottom and a plurality of walls connected to and extending upwardly from the bottom. The plurality of walls include a front wall, a rear wall, and at least a pair of side walls connected to and extending between the front and rear walls so as to define an inner chamber for positioning a child and child diaper items therein. Each of the front and rear walls and each of the pair of side walls has an outer surface thereof sized and shaped so as to simultaneously abuttingly contact the inner surface of a corresponding wall of a shopping cart seat when the container is positioned therein. The front wall has two leg openings formed therein which correspond to the leg openings in a shopping cart seat for extending the legs of a child therethrough when the container is positioned in a shopping cart. Seat liner and diaper bag converting means is connected to the at least a pair of side walls for selectively converting the container between a configuration defining a seat liner for a shopping cart seat and a configuration defining a diaper bag. A handle preferably is connected to and extending upwardly from the flexible container for enabling a user to readily carry the diaper bag and the seat liner.

The convertible combination shopping cart seat liner and diaper bag of the present invention advantageously can thereby be used as a substitute or an addition to the standard diaper bag that a family with small children often uses. The convertible combination shopping cart seat liner and diaper bag still advantageously allows a shopper to inhibit health and hygiene problems as well as dirt, roughness of seat, and other problems associated with standard child seats in shopping carts.

The seat liner and diaper bag converting means of the convertible combination of the present invention preferably includes side wall supporting and folding means connected to the at least a pair of side walls for supporting and folding the side walls of the container when used as a diaper bag and for providing flexible adaptation between the seat liner and the diaper bag. The seat liner and diaper bag converting means can further include front and rear wall connecting means connected to the front and rear walls for detachably connecting the front and rear walls when converting between the diaper bag and the seat liner and a pad detachably connected to a surface of at least the front wall of the container so as to extend over the leg openings formed therein when used as a diaper bag and for advantageously positioning infants therein in a protected and padded manner when used as a seat liner.

The present invention also advantageously provides methods of converting a shopping cart seat liner into a diaper bag and of converting a diaper bag into a shopping cart seat liner. A method of converting a shopping cart seat liner into a diaper bag preferably includes removing a child from a seat liner of a shopping cart seat, detachably connecting a pad to the inner surface of at least the front wall of the seat liner so as to extend over leg openings formed in the front wall thereof for use as a diaper bag, detachably connecting at least upper periphery portions of the seat liner, and removing the seat liner from the shopping cart seat.

A method of converting a shopping cart seat liner into a diaper bag is also provided according to another aspect of the present invention. The seat liner preferably has a bottom and a front wall, a rear wall, and at least a pair of side walls connected to and extending upwardly from the bottom so that outer surfaces of the bottom, the front and rear walls, and the pair of side walls simultaneously abuttingly contact inner surfaces of a corresponding wall of a shopping cart seat. The method includes detachably connecting a pad to a surface of at least the front wall of the seat liner so as to extend over leg openings formed in the front wall thereof for use as a diaper bag and detachably connecting at least upper periphery portions of the seat liner.

A method of converting a diaper bag into a shopping cart seat liner is also advantageously provided by the present invention. The diaper bag preferably has a bottom and a front wall, a rear wall, and at least a pair of side walls connected to and extending upwardly from the bottom. The method includes disconnecting a pair of fasteners which are respectively connected to at least upper peripheries of each of the pair of side walls of the diaper bag, disconnecting upper peripheries of the front wall and the rear wall of the diaper bag, and positioning an outer surface of each of the front wall, the rear wall, and the pair of side walls so as to simultaneously abuttingly contact inner surfaces of a corresponding wall of a shopping cart seat.

Yet another method of converting a diaper bag into a shopping cart seat liner is also provided according to another aspect of the present invention. The diaper bag preferably has a bottom and a front wall, a rear wall, and at least a pair of side walls connected to and extending upwardly from the bottom. The method preferably includes disconnecting a pair of fasteners which are respectively connected to at least upper peripheries of the diaper bag, extending the at least upper peripheries of the diaper bag outwardly to an open position, and positioning an outer surface of each of the front wall, the rear wall, and the pair of side walls so as to simultaneously abuttingly contact inner surfaces of a corresponding wall of a shopping cart seat.

BRIEF DESCRIPTION OF THE DRAWINGS

Some of the objects and advantages of the present invention having been stated, others will become apparent as the description proceeds when taken in conjunction with the accompanying drawings in which:

FIG. 3 is a perspective view of a convertible combination shopping cart seat liner and diaper bag in an open position having an auxiliary bag positioned therein and being converted for use as a shopping cart seat liner according to an embodiment of the present invention;

FIG. 4 is an enlarged and fragmentary perspective view of a first embodiment of an aspect of a seat liner and diaper bag converter of a convertible combination shopping car seat liner and diaper bag according to an embodiment of the present invention;

FIG. 5 is an enlarged and fragmentary side elevational view of a second embodiment of the same aspect of a seat liner and diaper bag converter as shown in FIG. 4 of a convertible combination shopping cart seat liner and diaper bag according to an embodiment of the present invention;

FIG. 6 is a perspective view of a convertible combination shopping cart seat liner and diaper bag being positioned so as to line a shopping cart seat according to an embodiment of the present invention;

FIG. 7 is a rear exploded view of a convertible combination shopping cart seat liner and diaper bag being positioned so as to line a shopping cart seat and having an auxiliary bag detachably connected thereto;

DETAILED DESCRIPTION

Figure 1:
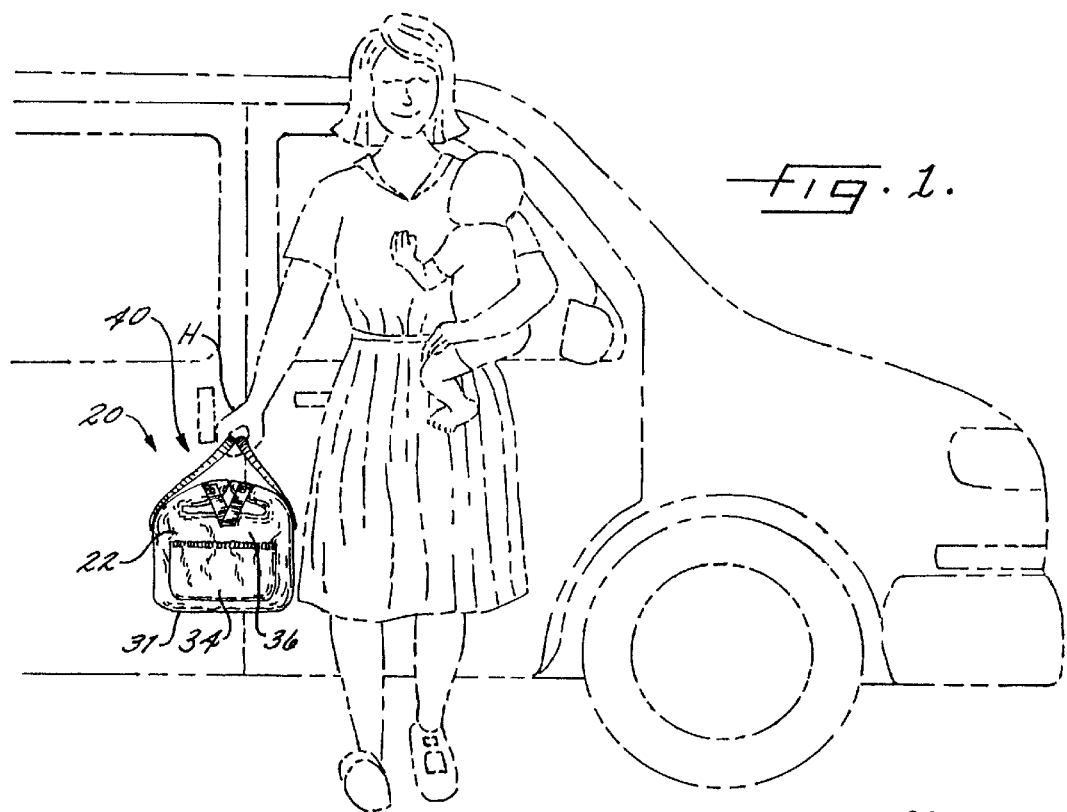
FIG. 1 is an environmental perspective view of a convertible combination shopping cart liner and diaper bag being used as a diaper bag and showing in phantom view a mother carrying a small child in one arm according to embodiment of the present invention.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and/or double prime notation are used to indicate similar elements in alternative embodiments.

FIGS. 1–2 and 6–8 illustrate a convertible combination shopping cart seat liner and diaper bag 20 for use as a both a seat liner 21 for lining the seat 25 of a shopping cart C and a diaper bag 22 for transporting various child diaper items therein according to an embodiment of the present invention. The convertible combination 20 preferably has a flexible container 30 sized and shaped to flexibly position within a shopping cart seat 25 of a shopping cart C (see e.g., FIGS. 3 and 6–8). The convertible container 30 has a bottom 31 and a plurality of walls 32, 33, 34, 35 connected to and extending upwardly from the bottom and has a generally rectangular shape. The plurality of walls 32, 33, 36, 37 include a front wall 32, a rear wall 33, and at least a pair of side walls 36, 37 connected to and extending between the front and rear walls 32, 33 so as to define an inner chamber 35 for positioning a child and child diaper items therein (see FIGS. 2–3, 6, and 8–9).

The bottom 31, front and rear walls 32, 33, and side walls 36, 37 preferably are formed of a padded cloth material, e.g., inner and outer panels of fabric having batting, cotton, or thin foam material positioned between the inner and outer panels, which advantageously can be readily washed and dried for protection of a child particularly when the container 30 is used as a seat liner 21 or when a diaper bag becomes soiled from various uses associated with children. One or more pockets 34 preferably are also connected to the outer surface of at least one of the plurality of walls 32, 33, 36, 37 for positioning child related items therein. As understood by those skilled in the art, the bottom 31 also can advantageously include an inner bottom liner 31a used as an exposed inner bottom surface and formed of a plastic material for protecting the diaper bag 22, as well as the seat liner 21, from moister damage such as initiated by the use of bottles, cups, other food or beverage containers, wet diapers, and wet clothes often associated with small children.

Figure 8:
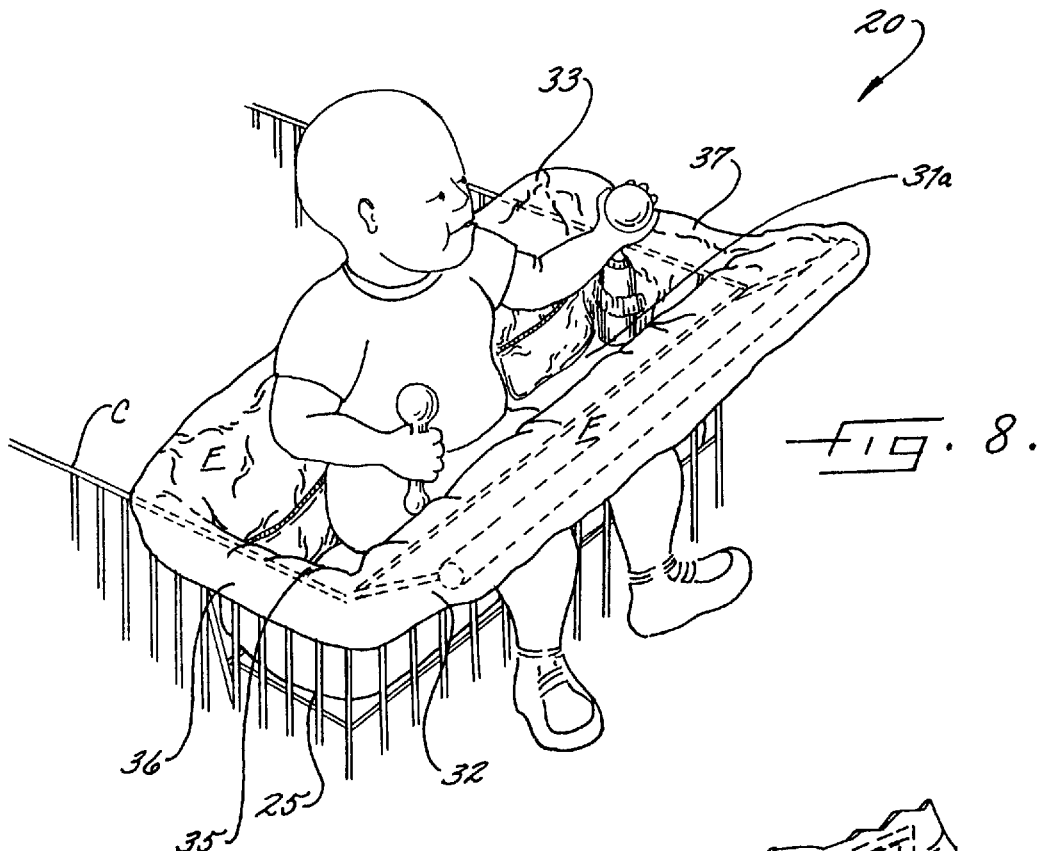
FIG. 8 is a perspective view of a convertible combination shopping cart seat liner and diaper bag being positioned so as to line a shopping cart seat and having a small child positioned therein according to an embodiment of the present invention.

As best illustrated in FIGS. 6–8, each of the front and rear walls 32, 33 and each of the pair of side walls 36, 37 has an outer surface thereof sized and shaped so as to simultaneously abuttingly contact the inner surface of a corresponding wall of a shopping cart seat 25 when the container 30 is positioned therein. The front wall 32 has two leg openings 38, 39 formed therein which correspond to the leg openings in a shopping cart seat 25 for extending the legs of a child therethrough when the container 30 is positioned in a shopping cart C (see FIGS. 6 and 9). A plurality of pockets also are connected to or formed along inner surfaces of the at least a pair of side walls for positioning various child diaper items or other child related items therein.

As best illustrated in FIGS. 2–5, 7, and 9, seat liner and diaper bag converting means 50 is connected to the at least a pair of side walls 36, 37 for selectively converting the container 30 between a configuration defining a seat liner 21 for a shopping cart seat 25 and a configuration defining a diaper bag 22. More particularly, the seat liner and diaper bag converting means 50, e.g., a seat liner and diaper bag converter, of the convertible combination of the present invention preferably includes side wall supporting and folding means 55 connected to the at least a pair of side walls 36, 37 for supporting and folding the side walls 36, 37 of the container 30 when used as a diaper bag 22 and for providing flexible adaptation between the seat liner 21 and the diaper bag 22.

The side wall supporting and folding means 55 preferably includes flexible side wall 36, 37, but, as best illustrated in the first and second embodiments of FIGS. 4 and 5, also includes fasteners 57a, 57a', 57b, 57b' connected to the side walls 36, 37 for detachably connecting to the upper periphery ends or flaps F of the front and rear walls 32, 33. These fasteners, for example, can be mating snaps 57a, 57b (FIGS. 2–4), mating hooks and loops 57a', 57b' (FIG. 5), or other fasteners which fastenly secure the flaps F to the side walls 36, 37. The flaps F thereby form a cover or top for the container 30 which can be helpful, for example, when used as a diaper bag 22. In yet another alternative embodiment, according to the present invention, the fasteners 57a, 57a', 57b, 57b' can also fasten or secure a pair of side panel flaps extending between the front and rear side walls 32, 33.

Figure 2:
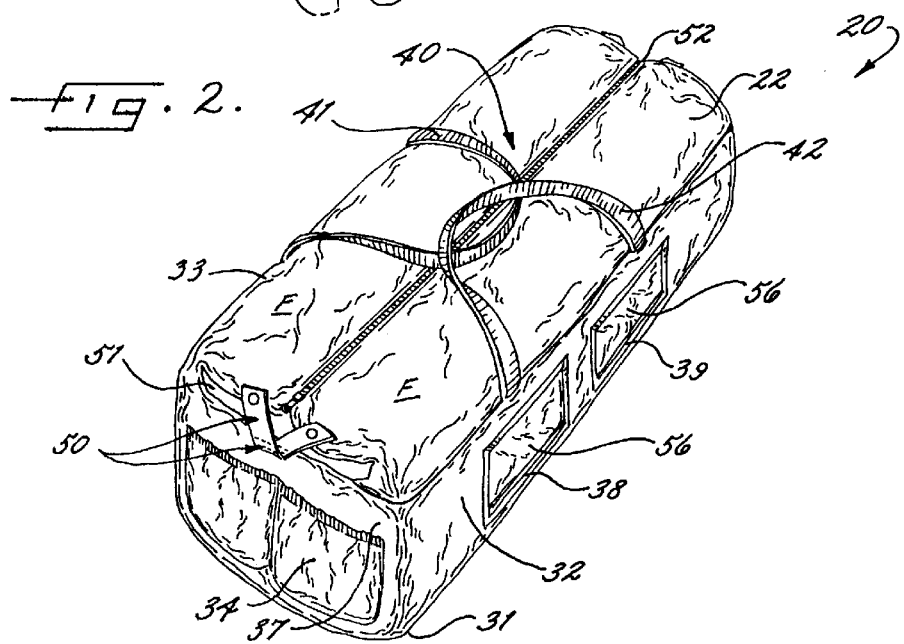
FIG. 2 is a perspective view of a convertible combination shopping cart seat liner and diaper bag being used as diaper bag according to an embodiment of the present invention.

Notably, however, an opening, groove, or channel 51 is formed in each of the side wall areas of the container 30 when used as a diaper bag 22 (see FIG. 2). The supporting and folding means 50 preferably advantageously allows the flexible and ready extension between the configuration of the seat liner 21 and the configuration of the diaper bag 22 without potentially dropping or losing items positioned within the inner chamber 35 and in manner which makes it relatively easy to accomplish, e.g., using a single hand H, for a parent or guardian carrying or managing one or more small children (see, e.g., FIG. 1).

The seat liner and diaper bag converting means 50 can also include front and rear wall connecting means 52, e.g., a zipper extending the substantial lengthwise extend of the upper periphery ends or flaps F of each of the front and rear walls 32, 33, connected to the front and rear walls 32, 33 for detachably connecting the front and rear walls 32, 33 when converting between the diaper bag 22 and the seat liner 21 (see FIGS. 2–3). The upper periphery ends or flaps F of the front and rear walls 32, 33 advantageously fold to a position wherein the inner surfaces thereof overlie the inner chamber 35 of the container 30. These flaps F also can advantageously be used so as to protectively overlie upper peripheries of the corresponding front and rear walls of a shopping cart seat 25.

Figure 9:
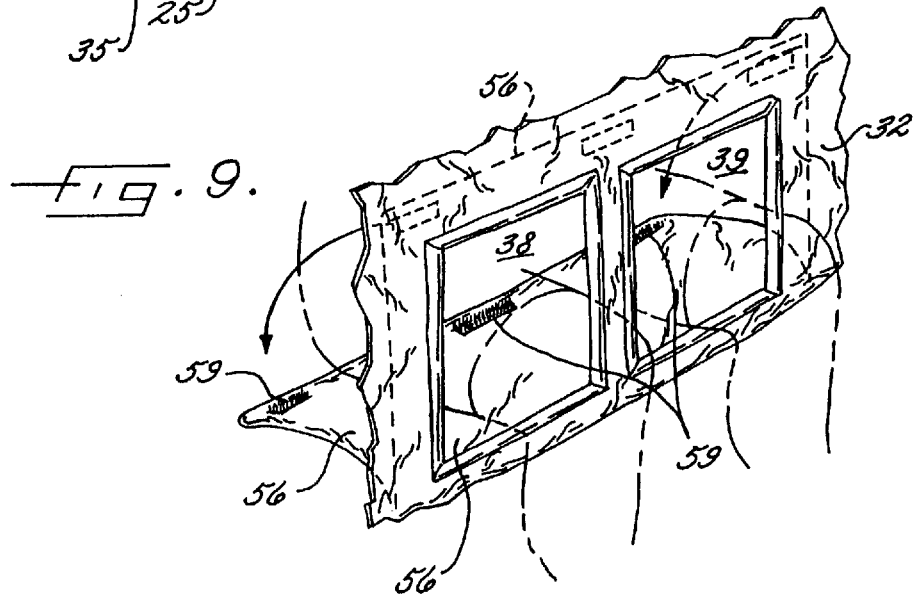
FIG. 9 is an enlarged fragmentary view of another aspect of a seat liner and diaper bag converter of a convertible combination shopping cart seat liner and diaper bag and having a small child's legs extending through leg openings in a front wall thereof according to an embodiment of the present invention.

As best illustrated in FIGS. 6 and 9, the seat liner and diaper bag converting means 50 further advantageously includes a pad 56, such as an infant pad, which preferably is detachably connected to a surface of at least the front wall 32 of the container 30 so as to extend over the leg openings 38, 39 formed therein when used as a diaper bag 22. The pad 56, for example, can be detachably connected by the use of fasteners 59, such as mating hook and loop fasteners as illustrated, fastening the pad 56 to the front wall 56. It will be understood by those skilled in the art that other fastening positions and configurations which cover the leg openings 38, 39 can be used as well according to the present invention. Also, the pad 56 can advantageously be used for positioning infants therein in a reclined position, e.g., lying down, in a protected and padded manner when used as a seat liner 21. The present invention thereby provides a convertible combination shopping cart seat liner 20 which allows a parent or guardian to easily convert, e.g., using only one hand, a shopping cart seat liner to a diaper bag and vice-versa even while carrying or managing a small child or infant (see, e.g., FIGS. 1, 3–5, and 7–9).

The convertible combination seat liner and diaper bag 20 also preferably has a handle 40 which preferably is connected to and extends upwardly from the flexible container 30 for enabling a user to readily carry the diaper bag 22 and the seat liner 21 (see FIGS. 1–2). The handle 40 of the convertible combination 20 preferably has or is defined by a pair of flexible and elongate straps 41, 42 each respectively connected to and extending upwardly from the front and rear walls 32, 33. The present invention thereby advantageously provides a convertible combination shopping cart seat liner and diaper bag 20 that readily converts a shopping cart seat liner 21 to a diaper bag 22 and vice-versa.

As illustrated in FIG. 7, securing means 45, e.g., a flexible fastener including an elongate strap, preferably is connected to at least one of the plurality of walls 32, 33, 36, 37 of the container 30, e.g., the rear wall 33, for securing the seat liner 21 to a shopping cart C to thereby inhibit a child from pulling the seat liner 21 out of the shopping cart seat 25. A plurality of flexible fasteners also can be respectively connected to each of the pair of side walls 36, 37 for fastening to a shopping cart seat 25 to thereby provide additional securing means for the convertible combination 20 when positioned. A decorative skirt additionally can be connected to upper peripheries of the plurality of walls 32, 33, 36, 37 and extending downwardly therefrom for extending over the front and rear walls and the pair of side walls of a shopping cart seat 21 so as to provide a decorative arrangement during use of the seat liner 21 and to further inhibit a child's contact with exposed surfaces of the shopping cart seat 25 (not shown). A child restraining strap 48, which includes a fastener connected thereto as illustrated (see FIG. 6), preferably is connected to the flexible container 30 and extends into the inner chamber 35 for surrounding the waist of a child when positioned in the seat liner 21 and the shopping cart seat 25 to thereby secure or inhibit a child from leaving or falling out of the shopping cart seat 25 or seat liner 21 itself (see FIG. 6). This child retraining strap can be the strap conventionally connected to a shopping cart seat 25 as understood by those skilled in the art, but preferably is not because of the personal hygiene aspects and advantages of the present invention.

As best illustrated in FIGS. 3, 6, and 7, the convertible combination shopping cart seat liner and diaper bag 20 can also advantageously include an auxiliary bag 70 which, for example, can be a supplemental diaper bag, a purse, or other bag. The auxiliary bag 70, as illustrated, can include a main body 71 for positioning various travel related items, shopping related items, and/or child diaper items therein and a handle or shoulder strap 72 connected to the main body for carrying or transporting the auxiliary bag 70. This supplemental or auxiliary bag 70, for example, can advantageously include diapers, ointments, wipes, bottles, a child's toys, a child's pacifiers, rattles, and/or other child diaper items being positioned within the inner chamber 35 of the container 30 in an organized, neat, and convenient manner.

As best illustrated in FIGS. 6–7, this auxiliary bag can then be removed and detachably connected to fasteners 75, for example, positioned along the rear wall 32 when the convertible combination 20 is being used as a shopping cart seat liner 21. When the auxiliary bag 70 is used, the fasteners 75 can be considered as a portion or element which contributes to the convertibility aspects of the present invention. The convertible combination shopping cart seat liner and diaper bag 20 of the present invention advantageously can thereby be readily used as a substitute or an addition to the standard diaper bag that a family with small children often uses. The present invention additionally thereby provides a convertible combination shopping cart seat liner 20 which advantageously reduces the number and location of child related items which a parent or guardian often desires to carry during shopping trips or travel in general (see, e.g., FIGS. 1, 3, and 8). The convertible combination shopping cart seat liner and diaper bag 30 still advantageously allows a shopper to inhibit health and hygiene problems as well as dirt, roughness of seat, and other problems associated with standard child seats 25 in shopping carts C.

As illustrated in FIGS. 1–9, and as described above, the present invention also advantageously provides methods of converting a shopping cart seat liner 21 into a diaper bag 22 and of converting a diaper bag 22 into a shopping cart seat liner 21. As best illustrated in FIGS. 1–5 and 8–9, a method of converting a shopping cart seat liner 21 into a diaper bag 22 preferably includes removing a child from a seat liner 21 of a shopping cart C seat, detachably connecting a pad 56 to a surface, e.g., an inner surface or, in the alternative, an outer surface, of at least the front wall of the seat liner 21 so as to extend over leg openings 38, 39 formed in the front wall 32 thereof for use as a diaper bag 22, detachably connecting at least upper periphery portions of the seat liner 21, and removing the seat liner 21 from the shopping cart seat 25.

The step of detachably connecting at least upper periphery portions of the seat liner 21 of this method preferably includes extending the at least upper periphery portions inwardly to a closed position, detachably connecting a pair of fasteners respectively connected to at least upper peripheries of each of a pair of side walls 36, 37 of the seat liner, and detachably connecting upper peripheries of a front wall 32 and a rear wall 33 of the seat liner 21. This method can also include positioning a pair of straps 41, 42 each respectively connected to and extending upwardly from the front and rear walls 32, 33 closely adjacent each other to thereby enable a user to readily carry the diaper bag 22 with a single hand H.

A method of converting a shopping cart seat liner 21 into a diaper bag 22 is also provided according to another aspect of the present invention. As described above, the seat liner 21 preferably has a bottom 31 and a front wall 32, a rear wall 33, and at least a pair of side walls 36, 37 connected to and extending upwardly from the bottom 31 so that outer surfaces of the bottom 31, the front and rear walls 32, 33, and the pair of side walls 36, 37 simultaneously abuttingly contact inner surfaces of a corresponding wall of a shopping cart seat 25. The method includes detachably connecting a pad 56 to a surface of at least the front wall 32 of the seat liner 21 so as to extend over leg openings 38, 39 formed in the front wall 32 thereof for use as a diaper bag 22 and detachably connecting at least upper periphery portions of the seat liner 21 (see FIGS. 2–4 and 8–9).

Likewise, the step of detachably connecting at least upper periphery portions of the seat liner 21 of this method preferably includes extending the at least upper periphery portions inwardly to a closed position, detachably connecting a pair of fasteners respectively connected to at least upper peripheries of each of the pair of side walls 36, 37 of the seat liner 21, and detachably connecting upper peripheries of the front wall 32 and the rear wall 33 of the seat liner 21. This method can also include positioning a pair of straps 41, 42 each respectively connected to and extending upwardly from the front and rear walls 32, 33 closely adjacent each other to thereby enable a user to readily carry the diaper bag 22 with a single hand H.

As best illustrated in FIGS. 2–5 and 7–9, a method of converting a diaper bag 22 into a shopping cart seat liner 21 is also advantageously provided by the present invention. The diaper bag 22 preferably has or is defined by a bottom 31 and a front wall 32, a rear wall 33, and at least a pair of side walls 36, 37 connected to and extending upwardly from the bottom 31. The method includes disconnecting a pair of fasteners which are respectively connected to at least upper peripheries of each of the pair of side walls 36, 37 of the diaper bag 21, disconnecting upper peripheries of the front wall 32 and the rear wall 33 of the diaper bag 22, and positioning an outer surface of each of the front wall 32, the rear wall 33, and the pair of side walls 36, 37 so as to simultaneously abuttingly contact inner surfaces of a corresponding wall of a shopping cart seat 25.

This method can also include disconnecting a pad 56 overlying a surface of at least the front wall 32 of the diaper bag 22 so as to reveal a pair of leg openings 38, 39 formed in the front wall 32 thereof. The pair of leg openings 38, 39 preferably correspond to the leg openings of a shopping cart seat 25 as illustrated. This method can further include separating a pair of straps 41, 42 which are each respectively connected to and extend upwardly from the front and rear walls 32, 33 of the diaper bag 22 and positioned closely adjacent each other when used as a diaper bag 22.

Yet another method of converting a diaper bag 22 into a shopping cart seat liner 21 is also provided according to another aspect of the present invention and also best illustrated in FIGS. 2–5 and 7–9. The diaper bag 22 preferably has or is defined by a bottom 31 and a front wall 32, a rear wall 33, and at least a pair of side walls 36, 37 connected to and extending upwardly from the bottom 31. The method preferably includes disconnecting a pair of fasteners which are respectively connected to at least upper peripheries of the diaper bag 22, extending the at least upper peripheries of the diaper bag 22 outwardly to an open position, and positioning an outer surface of each of the front wall 32, the rear wall 33, and the pair of side walls 36, 37 so as to simultaneously abuttingly contact inner surfaces of a corresponding wall of a shopping cart seat 25.

This method preferably can also include disconnecting a pad 56 overlying a surface of at least the front wall 32 of the diaper bag 22 so as to reveal a pair of leg openings 38, 39 formed in the front wall 32 thereof (see FIG. 9). The pair of leg openings 38, 39 preferably correspond to the leg openings of a shopping cart seat 25. A pair of straps 41, 42 each respectively connected to and extending upwardly from the front and rear walls 32, 33 of the diaper bag 22 and positioned closely adjacent each other when used as a diaper bag 22 are separated.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A convertible combination shopping cart seat liner and diaper bag for use as both a seat liner and a diaper bag, the convertible combination comprising:

a flexible, upstanding container sized and shaped to flexibly position within a shopping cart seat of a shopping cart, said convertible container having a bottom and a plurality of upstanding walls connected to and extending upwardly from said bottom, said bottom forming a bottom for both a configuration defining an upstanding diaper bag and a configuration defining an upstanding seat liner for a shopping cart, said plurality of upstanding walls including a front wall, a rear wall, and at least a pair of side walls connected to and extending between said front and rear walls so as to define a non-collapsed inner chamber for retaining child diaper items therein when in a substantially enclosed position, each of said front and rear walls and each of said pair of side walls having an outer surface thereof sized and shaped so as to simultaneously abuttingly contact the inner surface of a corresponding wall of a shopping cart seat when said container is positioned therein, said front wall having two leg openings formed therein which are adapted to correspond to the leg openings in a shopping cart seat for extending the legs of a child therethrough when said container is positioned in a shopping cart;

seat liner and diaper bag converting means connected to upper portions of said flexible, upstanding container when configured as an upstanding seat liner for a shopping cart for selectively converting said flexible, upstanding container between a configuration defining a seat liner for a shopping cart seat and a configuration defining a diaper bag; and a handle connected to and extending outwardly from said flexible, upstanding container for enabling a user to readily carry said flexible, upstanding container when configured as the diaper bag.

2. A convertible combination as defined in claim 1, wherein said seat liner and diaper bag converting means includes side wall supporting and folding means connected to said at least a pair of side walls for supporting and folding the side walls of said container when used as a diaper bag and for providing flexible adaptation between the seat liner and the diaper bag.

3. A convertible combination as defined in claim 1, wherein said seat liner and diaper bag converting means includes front and rear wall connecting means connected to said front and rear walls for detachably connecting said front and rear walls when converting between the diaper bag and the seat liner.

4. A convertible combination as defined in claim 1, wherein said seat liner and diaper bag converting means includes a pad detachably connected to a surface of at least the front wall of said container so as to extend entirely over the leg openings formed therein when used as a diaper bag and for positioning infants therein in a protected and padded manner when used as a seat liner.

5. A convertible combination as defined in claim 1, wherein said handle comprises a pair of straps each respectively connected to and extending outwardly from said front and rear walls.

6. A convertible combination as defined in claim 1, wherein the side walls and bottom are formed of a padded material for protection of a child when used as a seat liner.

7. A convertible combination as defined in claim 1, further comprising securing means connected to at least one of the plurality of walls of the container for securing the seat liner to a shopping cart seat to thereby inhibit a child from pulling the seat liner out of the shopping cart seat.

8. A convertible combination as defined in claim 1, further comprising an auxiliary bag adapted to be positioned within the inner chamber of the container for supplementally carrying child diaper items therein and being adapted to detachably connect to said rear wall of said container when positioned in a shopping cart seat during use of the seat liner.

9. A convertible combination as defined in claim 1, wherein said bottom includes an inner bottom liner formed of a plastic material for protecting the diaper bag from moisture damage.

10. A convertible combination as defined in claim 1, further comprising a child strap connected to said flexible container and extending into the inner chamber for surrounding the waist of a child when positioned in the seat liner and a shopping cart seat.

11. A convertible combination as defined in claim 1, wherein said bottom and said plurality of walls are each formed of a cloth material which can be readily washed and dried, and wherein the convertible combination further comprises a plurality of pockets connected to inner surfaces of said at least a pair of side walls for positioning baby items or child items therein.

12. A convertible combination shopping cart seat liner and diaper bag for use as both a seat liner and a diaper bag, the convertible combination comprising:

a flexible, upstanding container sized and shaped to flexibly position within a shopping cart seat of a shopping cart, said convertible container having a bottom and a plurality of upstanding walls connected to and extending upwardly from said bottom, said bottom forming a bottom for both a configuration defining an upstanding diaper bag and a configuration defining an upstanding seat liner for a shopping cart, said plurality of upstanding walls including a front wall, a rear wall, and at least a pair of side walls connected to and extending between said front and rear walls so as to define a non-collapsed inner chamber for retaining child diaper items therein when in a substantially enclosed position, each of said front and rear walls and each of said pair of side walls having an outer surface thereof sized and shaped so as to simultaneously abuttingly contact the inner surface of a corresponding wall of a shopping cart seat when said container is positioned therein, said front wall having two leg openings formed therein which correspond to the leg openings in a shopping cart seat for extending the legs of a child therethrough when said container is positioned in a shopping cart;

a seat liner and diaper bag converter connected to upper portions of said flexible, upstanding container when configured as an upstanding seat liner for a shopping cart for selectively converting said flexible, upstanding container between a configuration defining a seat liner for a shopping cart seat and a configuration defining a diaper bag, said seat liner and diaper bag converter including side wall supporting and folding means connected to said at least a pair of side walls for supporting and folding the side walls of said container when used as a diaper bag and for providing flexible adaptation between the seat liner and the diaper bag and a cover member detachably connected to a surface of at least the front wall of said container so as to extend entirely over the leg openings formed therein when used as a diaper bag; and a pair of straps respectively connected to and extending outwardly from said front and rear walls of said flexible, upstanding container for enabling a user to readily carry said flexible, upstanding container when configured as the diaper bag.

13. A convertible combination as defined in claim 12, wherein said seat liner and diaper bag converter further includes front and rear wall connecting means connected to said front and rear walls for detachably connecting said front and rear walls when converting between the diaper bag and the seat liner.

14. A convertible combination as defined in claim 13, wherein the side walls and bottom are formed of a padded material for protection of a child when used as a seat liner.

15. A convertible combination as defined in claim 14, further comprising securing means connected to at least one of the plurality of walls of the container for securing the seat liner to a shopping cart seat to thereby inhibit a child from pulling the seat liner out of the shopping cart seat.

16. A convertible combination as defined in claim 15, further comprising an auxiliary bag adapted to be positioned within the inner chamber of the container for supplementally carrying child diaper items therein and being adapted to connect to said rear wall of said container when positioned in a shopping cart seat during use of the seat liner.

17. A convertible combination as defined in claim 16, wherein said bottom includes an inner bottom liner formed of a plastic material for protecting the diaper bag from moisture damage.

18. A convertible combination as defined in claim 17, further comprising a child strap connected to said flexible container and extending into the inner chamber for surrounding the waist of a child when positioned in the seat liner and a shopping cart seat.

19. A convertible combination as defined in claim 18, wherein said bottom and said plurality of walls are each formed of a cloth material which can be readily washed and dried, and wherein the convertible combination further comprises a plurality of pockets connected to inner surfaces of said at least a pair of side walls for positioning baby items or child items therein.

20. A convertible combination shopping cart seat liner and diaper bag for use as both a seat liner and a diaper bag, the convertible combination comprising:

a flexible, upstanding container sized and shaped to flexibly position within a shopping cart seat of a shopping cart and formed of a padded cloth material, said flexible, upstanding container having a bottom and a upstanding plurality of walls connected to and extending upwardly from said bottom, said bottom forming a bottom for both a configuration defining an upstanding diaper bag and a configuration defining an upstanding seat liner for a shopping cart, said plurality of upstanding walls including a front wall, a rear wall, and at least a pair of side walls connected to and extending between said front and rear walls so as to define a non-collapsed inner chamber for selectively retaining child diaper items therein when in a substantially enclosed position, at least one of said side walls including a pocket connected to an inner surface of thereof for positioning child items therein, each of said front and rear walls and each of said pair of side walls having an outer surface thereof sized and shaped so as to simultaneously abuttingly contact the inner surface of a corresponding wall of a shopping cart seat when said container is positioned therein, said front wall having two leg openings formed therein which correspond to the leg openings in a shopping cart seat for extending the legs of a child therethrough when said container is positioned in a shopping cart;

seat liner and diaper bag converting means connected to upper portions of said flexible, upstanding container when configured as an upstanding seat liner for a shopping cart for selectively converting said flexible, upstanding container between a configuration defining a diaper bag and a configuration defining a seat liner for a shopping cart seat, said seat liner and diaper bag converting means including side wall supporting and folding means connected to said at least a pair of side walls for supporting and folding the side walls of said container when used as a diaper bag and for providing flexible adaptation between the seat liner and the diaper bag and a pad detachably connected to the inner surface of at least the front wall of said container so as to extend over the leg openings formed therein when used as a diaper bag; and a pair of straps respectively connected to and extending outwardly from said front and rear walls of said flexible, upstanding container for enabling a user to readily carry said flexible, upstanding container when configured as the diaper bag.

21. A convertible combination as defined in claim 20, wherein upper peripheries of each of said front and rear walls include a flap, and wherein said seat liner and diaper bag converting means includes front and rear wall connecting means connected to each of the respective flaps of said front and rear walls for detachably connecting said front and rear walls when converting between the diaper bag and the seat liner.

22. A convertible combination as defined in claim 21, further comprising securing means connected to at least one of the plurality of walls of the container for securing the seat liner to a shopping cart seat to thereby inhibit a child from pulling the seat liner out of the shopping cart seat.

23. A convertible combination as defined in claim 22, further comprising an auxiliary bag adapted to be positioned within the inner chamber of the container for supplementally carrying child diaper items therein and being adapted to detachably connect to said rear wall of said container when positioned in a shopping cart seat during use of the seat liner.

24. A convertible combination as defined in claim 23, wherein said bottom includes an inner bottom liner formed of a plastic material for protecting the diaper bag from moisture damage.

25. A convertible combination as defined in claim 24, further comprising a child strap connected to said flexible container and extending into the inner chamber for surrounding the waist of a child when positioned in the seat liner and a shopping cart seat.

26. A method of selectively converting an upstanding shopping cart seat liner including at least a front wall and a rear wall into an upstanding diaper bag, the method comprising:

removing a child from a seat liner of a shopping cart seat;

connecting a cover member to a surface of at least the front wall of the seat liner so as to extend entirely over leg openings formed in the front wall thereof for use as a diaper bag;

detachably connecting at least upper periphery portions of the front wall of the seat liner to at least upper periphery portions of the rear wall of the seat liner so as to form an upstanding diaper bag in a closed position; and removing the upstanding diaper bag in the closed position from the shopping cart seat.

27. A method as defined in claim 26, wherein the step of detachably connecting at least upper periphery portions of the seat liner includes extending the at least upper periphery portions inwardly to a closed position, detachably connecting a pair of fasteners respectively connected to at least upper peripheries of each of a pair of side walls of the seat liner, and detachably connecting upper peripheries of a front wall and a rear wall of the seat liner.

28. A method as defined in claim 27, further comprising positioning a pair of straps each respectively connected to and extending outwardly from the front and rear walls closely adjacent each other to thereby enable a user to readily carry the diaper bag with a single hand.

29. A method of selectively converting an upstanding shopping cart seat liner into an upstanding diaper bag, the upstanding seat liner having a bottom and a front wall, a rear wall, and at least a pair of side walls connected to and extending upwardly from the bottom so that outer surfaces of the bottom, the front and rear walls, and the pair of side walls simultaneously abuttingly contact inner surfaces of a corresponding wall of a shopping cart seat, the bottom forming a bottom for both a configuration defining an upstanding diaper bag and a configuration defining the upstanding seat liner for a shopping cart, the method comprising:

connecting a cover member to a surface of at least the front wall of the seat liner so as to extend entirely over leg openings formed in the front wall thereof for use as an upstanding diaper bag; and detachably connecting at least upper periphery portions of the upstanding seat liner so as to form a substantially enclosed inner chamber defined by at least the upstanding front, rear, and pair of side walls.

30. A method as defined in claim 29, wherein the step of detachably connecting at least upper periphery portions of the seat liner includes extending the at least upper periphery portions inwardly to a closed position, detachably connecting a pair of fasteners respectively connected to at least upper peripheries of each of the pair of side walls of the seat liner, and detachably connecting upper peripheries of the front wall and the rear wall of the seat liner.

31. A method as defined in claim 30, further comprising positioning a pair of straps each respectively connected to and extending outwardly from the front and rear walls closely adjacent each other to thereby enable a user to readily carry the diaper bag with a single hand.

32. A method of selectively converting an upstanding diaper bag into an upstanding shopping cart seat liner, the upstanding diaper bag having a bottom and a front wall, a rear wall, and at least a pair of side walls connected to and extending upwardly from the bottom so as to define a non-collapsed inner chamber, the bottom forming a bottom for both a configuration defining an upstanding diaper bag and a configuration defining the upstanding seat liner for a shopping cart, the front wall including a pair of leg openings, the method comprising:

disconnecting a pair of fasteners, the pair of fasteners being respectively connected to at least upper peripheries of the upstanding diaper bag;

positioning an outer surface of each of the front wall, the rear wall, the bottom, and the pair of side walls so as to simultaneously abuttingly contact inner surfaces of a corresponding wall of a shopping cart seat and so as to define an upstanding seat liner; and positioning a child in the shopping cart seat so that the legs of the child extend through the pair of leg openings in the front wall thereof.

33. A method as defined in claim 32, further comprising disconnecting a pad entirely overlying the inner surface of at least the front wall of the diaper bag so as to reveal a pair of leg openings formed in the front wall thereof, the pair of leg openings corresponding to the leg openings of a shopping cart seat.

34. A method as defined in claim 33, further comprising separating a pair of straps each respectively connected to and extending upwardly from the front and rear walls of the diaper bag and positioned closely adjacent each other when used as a diaper bag.

35. A method of selectively converting an upstanding diaper bag into an upstanding shopping cart seat liner, the upstanding diaper bag having a bottom and a front wall, a rear wall, and at least a pair of side walls connected to and extending upwardly from the bottom so as to define a non-collapsed inner chamber, the bottom forming a bottom for both a configuration defining an upstanding diaper bag and a configuration defining the upstanding seat liner for a shopping cart, the front wall including a pair of leg openings, the method comprising:

disconnecting a pair of fasteners, the pair of fasteners being respectively connected to at least upper peripheries of the upstanding diaper bag;

extending the at least upper peripheries of the upstanding diaper bag outwardly to an open position;

positioning an outer surface of each of the front wall, the rear wall, the bottom, and the pair of side walls so as to simultaneously abuttingly contact inner surfaces of a corresponding wall of a shopping cart seat and so as to define an upstanding shopping cart seat liner; and positioning a child in the shopping cart seat so that the legs of the child extend through the pair of leg openings in the front wall thereof.

36. A method as defined in claim 35, further comprising disconnecting a pad overlying a surface of at least the front wall of the diaper bag so as to reveal a pair of leg openings formed in the front wall thereof, the pair of leg openings corresponding to the leg openings of a shopping cart seat.

37. A method as defined in claim 36, further comprising separating a pair of straps each respectively connected to and extending upwardly from the front and rear walls of the diaper bag and positioned closely adjacent each other when used as a diaper bag.

38. A convertible combination shopping cart seat liner and diaper bag for use as both a seat liner and a diaper bag, the convertible combination comprising:

a flexible container sized and shaped to flexibly position within a shopping cart seat of a shopping cart, said convertible container having a bottom and a plurality of walls connected to and extending upwardly from said bottom, said plurality of walls including a front wall, a rear wall, and at least a pair of side walls connected to and extending between said front and rear walls so as to define an inner chamber for positioning a child and child diaper items therein, each of said front and rear walls and each of said pair of side walls having an outer surface thereof sized and shaped so as to simultaneously abuttingly contact the inner surface of a corresponding wall of a shopping cart seat when said container is positioned therein, said front wall having two leg openings formed therein which correspond to the leg openings in a shopping cart seat for extending the legs of a child therethrough when said container is positioned in a shopping cart;

seat liner and diaper bag converting means connected to said at least a pair of side walls for selectively converting said container between a configuration defining a seat liner for a shopping cart seat and a configuration defining a diaper bag;

an auxiliary bag adapted to be positioned within the inner chamber of the container for supplementally carrying child diaper items therein and being adapted to connect to said rear wall of said container when positioned in a shopping cart seat during use of the seat liner; and a handle connected to and extending upwardly from said flexible container for enabling a user to readily carry the diaper bag and the seat liner.

39. A convertible combination shopping cart seat liner and diaper bag for use as both a seat liner and a diaper bag, the convertible combination comprising:

a flexible container sized and shaped to flexibly position within a shopping cart seat of a shopping cart, said convertible container having a bottom and a plurality of walls connected to and extending upwardly from said bottom, said plurality of walls including a front wall, a rear wall, and at least a pair of side walls connected to and extending between said front and rear walls so as to define an inner chamber for positioning a child and child diaper items therein, each of said front and rear walls and each of said pair of side walls having an outer surface thereof sized and shaped so as to simultaneously abuttingly contact the inner surface of a corresponding wall of a shopping cart seat when said container is positioned therein, said front wall having two leg openings formed therein which correspond to the leg openings in a shopping cart seat for extending the legs of a child therethrough when said container is positioned in a shopping cart, the side walls and bottom being formed of a padded material for protection of a child when used as a seat liner;

a seat liner and diaper bag converter connected to said at least a pair of side walls for selectively converting said container between a configuration defining a seat liner for a shopping cart seat and a configuration defining a diaper bag, said seat liner and diaper bag converter including side wall supporting and folding means connected to said at least a pair of side walls for supporting and folding the side walls of said container when used as a diaper bag and for providing flexible adaptation between the seat liner and the diaper bag, front and rear wall connecting means connected to said front and rear walls for detachably connecting said front and rear walls when converting between the diaper bag and the seat liner, and a pad detachably connected to a surface of at least the front wall of said container so as to extend over the leg openings formed therein when used as a diaper bag;

securing means connected to at least one of the plurality of walls of the container for securing the seat liner to a shopping cart seat to thereby inhibit a child from pulling the seat liner out of the shopping cart seat;

an auxiliary bag adapted to be positioned within the inner chamber of the container for supplementally carrying child diaper items therein and being adapted to connect to said rear wall of said container when positioned in a shopping cart seat during use of the seat liner; and a pair of straps respectively connected to and extending upwardly from said front and rear walls of said flexible container for enabling a user to readily carry the diaper bag and the seat liner.

40. A convertible combination as defined in claim 39, wherein said bottom includes an inner bottom liner formed of a plastic material for protecting the diaper bag from moisture damage.

41. A convertible combination as defined in claim 40, further comprising a child strap connected to said flexible container and extending into the inner chamber for surrounding the waist of a child when positioned in the seat liner and a shopping cart seat.

42. A convertible combination as defined in claim 41, wherein said bottom and said plurality of walls are each formed of a cloth material which can be readily washed and dried, and wherein the convertible combination further comprises a plurality of pockets connected to inner surfaces of said at least a pair of side walls for positioning baby items or child items therein.

43. A convertible combination shopping cart seat liner and diaper bag for use as both a seat liner and a diaper bag, the convertible combination comprising:

a flexible container sized and shaped to flexibly position within a shopping cart seat of a shopping cart and formed of a padded cloth material, said convertible container having a bottom and a plurality of walls connected to and extending upwardly from said bottom, said plurality of walls including a front wall, a rear wall, and at least a pair of side walls connected to and extending between said front and rear walls so as to define an inner chamber for selectively positioning a child or child diaper items therein, at least one of said side walls including a pocket connected to an inner surface of thereof for positioning child items therein, each of said front and rear walls and each of said pair of side walls having an outer surface thereof sized and shaped so as to simultaneously abuttingly contact the inner surface of a corresponding wall of a shopping cart seat when said container is positioned therein, said front wall having two leg openings formed therein which correspond to the leg openings in a shopping cart seat for extending the legs of a child therethrough when said container is positioned in a shopping cart;

seat liner and diaper bag converting means connected to said at least a pair of side walls for selectively converting said container between a configuration defining a diaper bag and a configuration defining a seat liner for a shopping cart seat, said seat liner and diaper bag converting means including side wall supporting and folding means connected to said at least a pair of side walls for supporting and folding the side walls of said container when used as a diaper bag and for providing flexible adaptation between the seat liner and the diaper bag, front and rear wall connecting means connected to said front and rear walls for detachably connecting said front and rear walls when converting between the diaper bag and the seat liner, and a pad detachably connected to the inner surface of at least the front wall of said container so as to extend over the leg openings formed therein when used as a diaper bag;

securing means connected to at least one of the plurality of walls of the container for securing the seat liner to a shopping cart seat to thereby inhibit a child from pulling the seat liner out of the shopping cart seat;

an auxiliary bag adapted to be positioned within the inner chamber of the container for supplementally carrying child diaper items therein and being adapted to connect to said rear wall of said container when positioned in a shopping cart seat during use of the seat liner; and a pair of straps respectively connected to and extending upwardly from said front and rear walls of said flexible container for enabling a user to readily carry the diaper bag and the seat liner.

44. A convertible combination as defined in claim 43, wherein said bottom includes an inner bottom liner formed of a plastic material for protecting the diaper bag from moisture damage.

45. A convertible combination as defined in claim 44, further comprising a child strap connected to said flexible container and extending into the inner chamber for surrounding the waist of a child when positioned in the seat liner and a shopping cart seat.

* * * * *